US009119251B2

(12) United States Patent
Kiyota

(10) Patent No.: US 9,119,251 B2
(45) Date of Patent: Aug. 25, 2015

(54) LED CURRENT CONTROL APPARATUS

(71) Applicant: KABUSHIKI KAISHA TOSHIBA, Minato-ku (JP)

(72) Inventor: Shinichi Kiyota, Kanagawa-ken (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 127 days.

(21) Appl. No.: 13/975,989

(22) Filed: Aug. 26, 2013

(65) Prior Publication Data

US 2014/0239830 A1 Aug. 28, 2014

(30) Foreign Application Priority Data

Feb. 22, 2013 (JP) ................................ 2013-033318

(51) Int. Cl.
*H05B 37/00* (2006.01)
*H05B 33/08* (2006.01)

(52) U.S. Cl.
CPC .......... *H05B 33/0815* (2013.01); *Y02B 20/347* (2013.01)

(58) Field of Classification Search
CPC .......... H05B 33/0821; H05B 33/0815; H05B 33/0803; H05B 33/0818; H05B 41/34; H05B 41/2828; H05B 39/09
USPC ............ 315/200 R, 294, 291, 201, 219, 221, 315/297, 302; 363/56.11, 21.13, 17; 327/108–112, 378–391; 326/82, 83, 87
See application file for complete search history.

(56) References Cited

U.S. PATENT DOCUMENTS 7,035,122 B2 * 4/2006 Kim et al. .................. 363/21.18
7,898,823 B2 * 3/2011 Wu ............................ 363/21.12
8,102,683 B2 1/2012 Gaknoki et al.
2011/0266969 A1 * 11/2011 Ludorf .......................... 315/294
2013/0044521 A1 * 2/2013 Zhao et al. ................. 363/21.17
2013/0249440 A1 * 9/2013 Doshi et al. ................... 315/309
2013/0314961 A1 * 11/2013 Eom et al. ....................... 363/89
2014/0268918 A1 * 9/2014 Gong ......................... 363/21.15

FOREIGN PATENT DOCUMENTS

JP 2012-085486 A 4/2012
JP 2012-196130 A 10/2012

* cited by examiner

*Primary Examiner* — Lincoln Donovan
*Assistant Examiner* — Thomas Skibinski
(74) *Attorney, Agent, or Firm* — White & Case LLP

(57) ABSTRACT

According to an embodiment, an LED current control apparatus controls conduction of a switching transistor which is connected to a primary winding of a flyback convertor. The LED current control apparatus includes a pseudo sine wave generation unit, a synchronous control unit, a first comparator, a switch control unit, a crest value correction unit, and a pulse monitor control unit.

10 Claims, 10 Drawing Sheets

N:SMALL
112
| C1 | T1 |
|---|---|
| 1 | 0.00 |
| 2 | 0.26 |
| 3 | 0.50 |
| 4 | 0.71 |
| 5 | 0.87 |
| 6 | 0.97 |
| 7 | 1.00 |
| 8 | 0.97 |
| 9 | 0.87 |
| 10 | 0.71 |
| 11 | 0.50 |
| 12 | 0.26 |
| 13 | 0.00 |
FIG.5 (a)
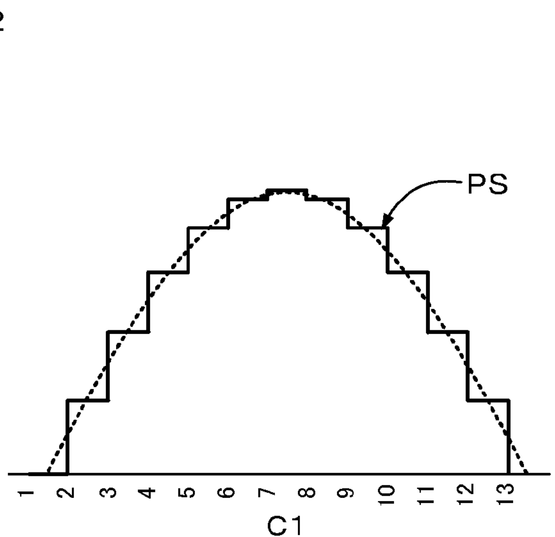
FIG.5 (b)
N:LARGE
112
| C1 | T1 |
|---|---|
| 1 | 0.00 |
| 2 | 0.13 |
| 3 | 0.26 |
| 4 | 0.38 |
| 5 | 0.50 |
| 6 | 0.61 |
| 7 | 0.71 |
| 8 | 0.79 |
| 9 | 0.87 |
| 10 | 0.92 |
| 11 | 0.97 |
| 12 | 0.99 |
| 13 | 1.00 |
| 14 | 0.99 |
| 15 | 0.97 |
| 16 | 0.92 |
| 17 | 0.87 |
| 18 | 0.79 |
| 19 | 0.71 |
| 20 | 0.61 |
| 21 | 0.50 |
| 22 | 0.38 |
| 23 | 0.26 |
| 24 | 0.13 |
| 25 | 0.00 |
FIG.5 (c)
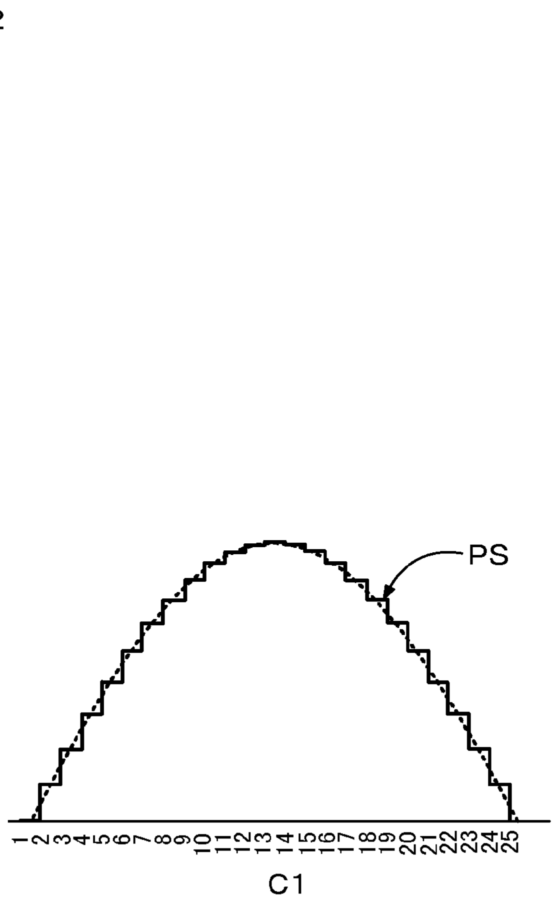
FIG.5 (d)

112

| C1 | T1 |
|---|---|
| 1 | 0. 00 |
| 2 | 0. 13 |
| 3 | 0. 26 |
| 4 | 0. 38 |
| 5 | 0. 50 |
| 6 | 0. 61 |
| 7 | 0. 71 |
| 8 | 0. 79 |
| 9 | 0. 87 |
| 10 | 0. 92 |
| 11 | 0. 97 |
| 12 | 0. 99 |
| 13 | 1. 00 |
| 14 | 0. 99 |
| 15 | 0. 97 |
| 16 | 0. 92 |
| 17 | 0. 87 |
| 18 | 0. 79 |
| 19 | 0. 71 |
| 20 | 0. 61 |
| 21 | 0. 50 |
| 22 | 0. 38 |
| 23 | 0. 26 |
| 24 | 0. 13 |
| 25 | 0. 00 |

211

| P1 |
|---|
| 0. 00 |
| −0. 06 |
| −0. 12 |
| −0. 17 |
| −0. 22 |
| −0. 26 |
| −0. 29 |
| −0. 30 |
| −0. 31 |
| −0. 29 |
| −0. 27 |
| −0. 22 |
| −0. 16 |
| −0. 08 |
| 0. 00 |
| +0. 08 |
| +0. 13 |
| +0. 21 |
| +0. 26 |
| +0. 28 |
| +0. 27 |
| +0. 24 |
| +0. 17 |
| +0. 09 |
| 0. 00 |

| C1 | T2 |
|---|---|
| 1 | 0. 00 |
| 2 | 0. 07 |
| 3 | 0. 14 |
| 4 | 0. 21 |
| 5 | 0. 28 |
| 6 | 0. 35 |
| 7 | 0. 42 |
| 8 | 0. 49 |
| 9 | 0. 56 |
| 10 | 0. 63 |
| 11 | 0. 70 |
| 12 | 0. 77 |
| 13 | 0. 84 |
| 14 | 0. 91 |
| 15 | 0. 97 |
| 16 | 1. 00 |
| 17 | 1. 00 |
| 18 | 1. 00 |
| 19 | 0. 97 |
| 20 | 0. 89 |
| 21 | 0. 77 |
| 22 | 0. 62 |
| 23 | 0. 43 |
| 24 | 0. 24 |
| 25 | 0. 00 |

LED CURRENT CONTROL APPARATUS

CROSS REFERENCE TO RELATED APPLICATION

This application is based upon and claims the benefit of priority from the prior Japanese Patent Application No. 2013-033318, filed on Feb. 22, 2013, the entire contents of which are incorporated herein by reference.

FIELD

Embodiments described hereinafter relate to a light emitting diode (LED) current control apparatus.

BACKGROUND

In a case to perform LED illumination with commercial AC power, full-wave rectification is performed with a diode bridge circuit on output of a dimmer connected to the AC power, and an LED is operated via a transformer (flyback convertor) having a flyback configuration. At that time, an LED current control apparatus controls a current flowing through a primary winding of the flyback convertor with a switch circuit to control a current flowing through a secondary winding. A conventional LED current control apparatus monitors a width of a current flowing through the secondary winding, and PWM control is performed on switching timing of the switch circuit connected to the primary winding, for example. Thus, the LED connected to the secondary winding is lighted with mean current control.

When peaks of the AC input voltage are constant, energy accumulated at the primary winding of the flyback convertor is constant as well. Accordingly, energy supplied to the LED connected to the secondary winding is constant and brightness of the LED illumination is stabilized as well.

However, peak voltages of commercial AC powers largely vary in accordance with regions and infrastructures to be in a range of 100 to 240 V as standard. With a conventional LED current control apparatus, there has been a problem that a mean LED current fluctuates in proportion to magnitude of a peak voltage of an AC power and that brightness of LED illumination fluctuates as well.

Further, since an LED has smaller consumption power than a conventional filament lamp and a phase of an AC input current waveform is not delayed owing to that an LED is not an induction load, there has been a problem that a high power factor is difficult to be obtained.

BRIEF DESCRIPTION OF THE DRAWINGS

FIGS. 5(*a*) to 5(*d*) are diagrams showing a pseudo sine wave in the LED current control apparatus according to the first embodiment;

DETAILED DESCRIPTION

Figure 1:
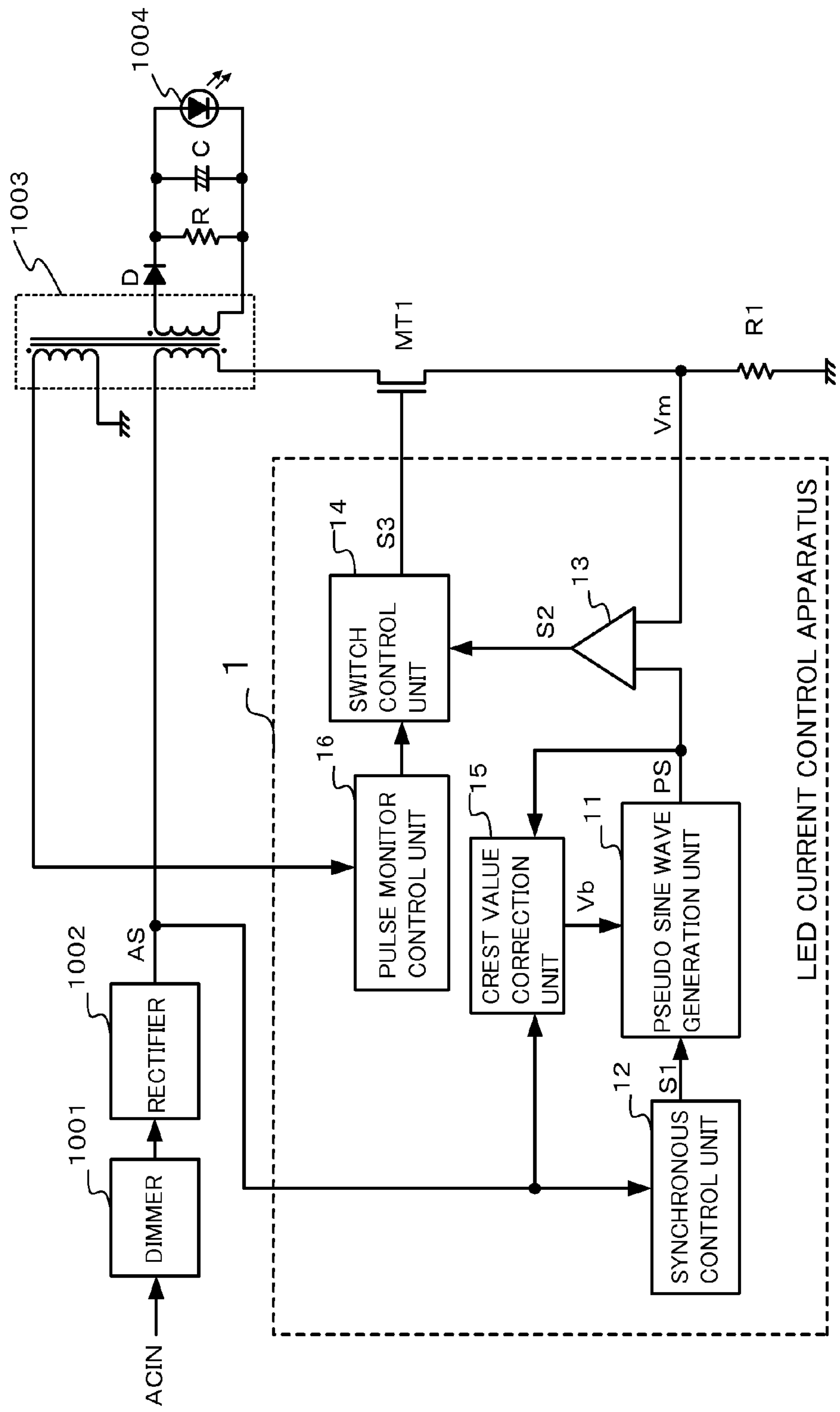
FIG. 1 is a block diagram showing a configuration of an LED current control apparatus according to a first embodiment.

According to an embodiment, an LED current control apparatus controls conduction of a switching transistor which is connected to a primary winding of a flyback convertor. A rectified wave obtained by rectifying AC input is input to a primary side of the flyback convertor and an LED is connected to a secondary side of the flyback convertor. The LED current control apparatus includes a pseudo sine wave generation unit, a synchronous control unit, a first comparator, a switch control unit, a crest value correction unit, and a pulse monitor control unit. The pseudo sine wave generation unit generates a pseudo sine wave having a constant crest value. The synchronous control unit synchronizes a cycle of the pseudo sine wave with a cycle of the rectified wave. The first comparator compares a voltage value obtained by converting a current flowing through the switching transistor into a voltage with a voltage value of the pseudo sine wave. The switch control unit controls conduction of the switching transistor in accordance with a comparison result of the first comparator. The crest value correction unit corrects a crest value of the pseudo sine wave in accordance with variation of crest values of the rectified wave. The pulse monitor control unit monitors a pulse width supplied to the secondary winding using a tertiary winding of the flyback convertor and adjusts a switch frequency of the switch control unit.

In the following, embodiments will be described with reference to the drawings. In the drawings, the same reference denotes the same or similar portions.

An LED current control unit according to a first embodiment will be described with reference to the drawings. FIG. 1 is a block diagram showing a configuration of the LED current control apparatus.

The LED control apparatus 1 of the embodiment controls conduction of a switching transistor MT1 which is connected to a primary winding of a flyback convertor 1003. A rectified wave AS output from a rectifier 1002 which performs full-wave rectification on output of a dimmer 1001 connected to a commercial AC power ACIN is input to a primary side of the flyback convertor 1003 and a LED 1004 is connected to a secondary side of the flyback convertor 1003.

As shown in FIG. 1, the LED current control apparatus 1 includes a pseudo sine wave generation unit 11, a synchronous control unit 12, a comparator 13 (the first comparator), a switch control unit 14, a crest value correction unit 15, and a pulse monitor control unit 16. The pseudo sine wave generation unit 11 generates a pseudo sine wave PS having a constant crest value. The synchronous control unit 12 synchronizes a cycle of the pseudo sine wave PS with a cycle of the rectified wave AS output from the rectifier 1002. The comparator 13 performs comparison between a voltage value of the pseudo sine wave PS and an output voltage value Vm. The output voltage value Vm is an output voltage value of a sensing resistor R1 which converts a current flowing through the switching transistor MT1 into a voltage. The switch control unit 14 controls conduction of the switching transistor MT1 in accordance with a comparison result of the comparator 13. The crest value correction unit 15 corrects a crest value of the pseudo sine wave PS in accordance with variation of crest values of the rectified wave AS. The pulse monitor control unit 16 monitors a pulse width supplied to a secondary winding using a tertiary winding of the flyback convertor 1003 and adjusts a switch frequency of the switch control unit 14.

Figure 2:
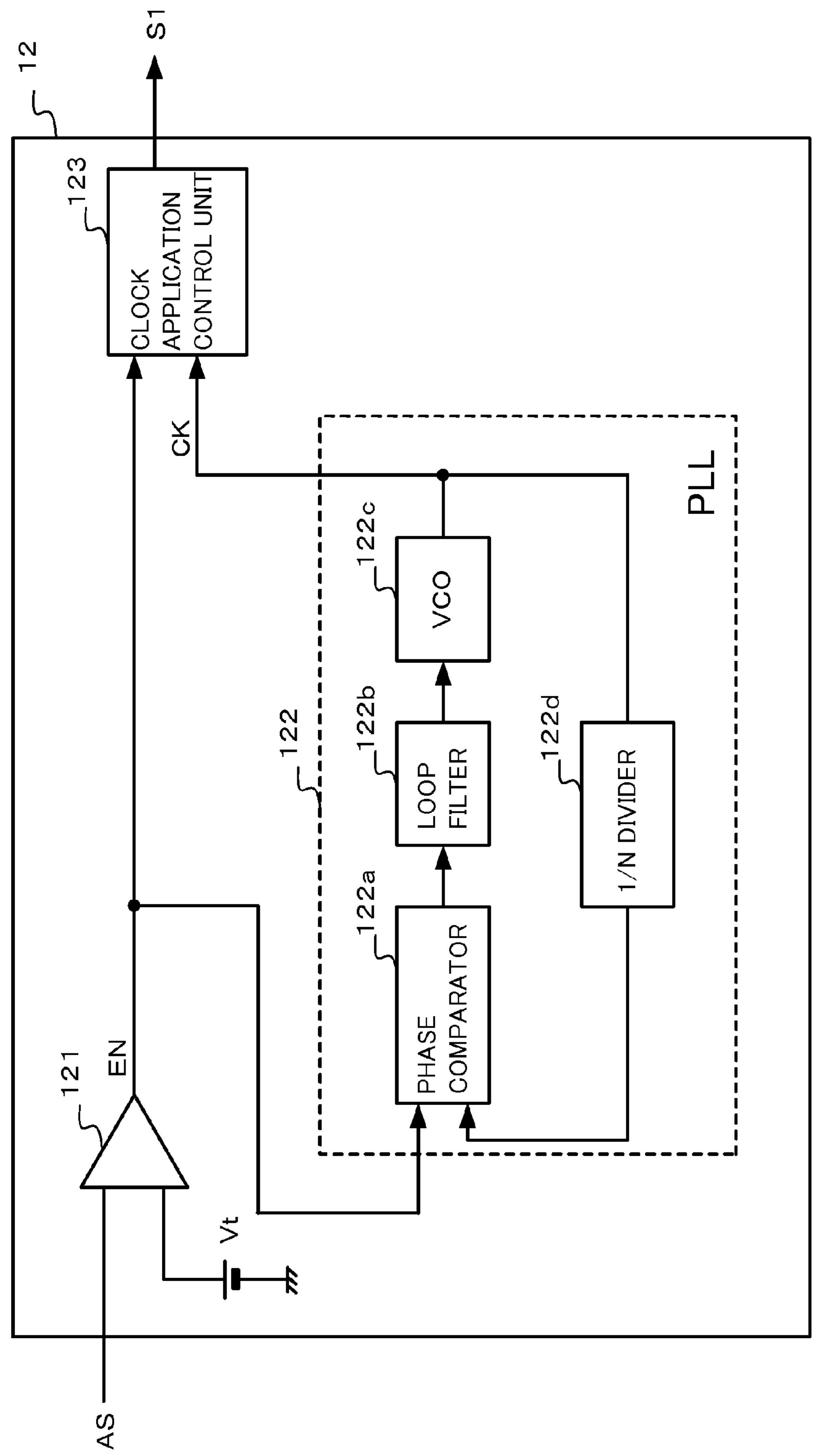
FIG. 2 is a block diagram showing a configuration of a synchronous control unit of the LED current control apparatus according to the first embodiment.

FIG. 2 is a block diagram showing an internal configuration of the synchronous control unit 12.

As illustrated in FIG. 2, the synchronous control unit 12 includes a voltage comparator 121, a PLL circuit 122, and a clock application control unit 123. The voltage comparator 121 compares a voltage of the rectified wave AS output from the rectifier 1002 with a previously-set threshold value Vt and outputs an enable signal EN being at high (H) level during a time in which the voltage of the rectified wave AS exceeds the threshold value Vt. The PLL circuit 122 outputs a clock signal CK obtained by n-times multiplying a frequency of the enable signal EN. The clock application control unit 123 outputs a signal S1 having the clock signal CK output during a time in which the enable signal EN is at H-level to the pseudo sine wave generation unit 11.

The PLL circuit 122 includes a phase comparator 122*a*, a loop filter 122*b*, a voltage controlled oscillator (VCO) 122*c*, and a 1/N divider 122*d*.

The 1/N divider 122*d* divides the frequency of the output CK of the VCO 122*c* by N.

The phase comparator 122*a* detects a phase difference between the enable signal EN and the output of the 1/N divider 122*d*. The loop filter 122*b* performs low-band filtering on a phase difference signal output from the phase comparator 122*a* to generate a control voltage of the VCO 122*c*.

As a result, the output CK of the VCO 122*c* is controlled to have a frequency being N-times of the frequency of the enable signal EN as being synchronized with the enable signal EN.

Figure 3:
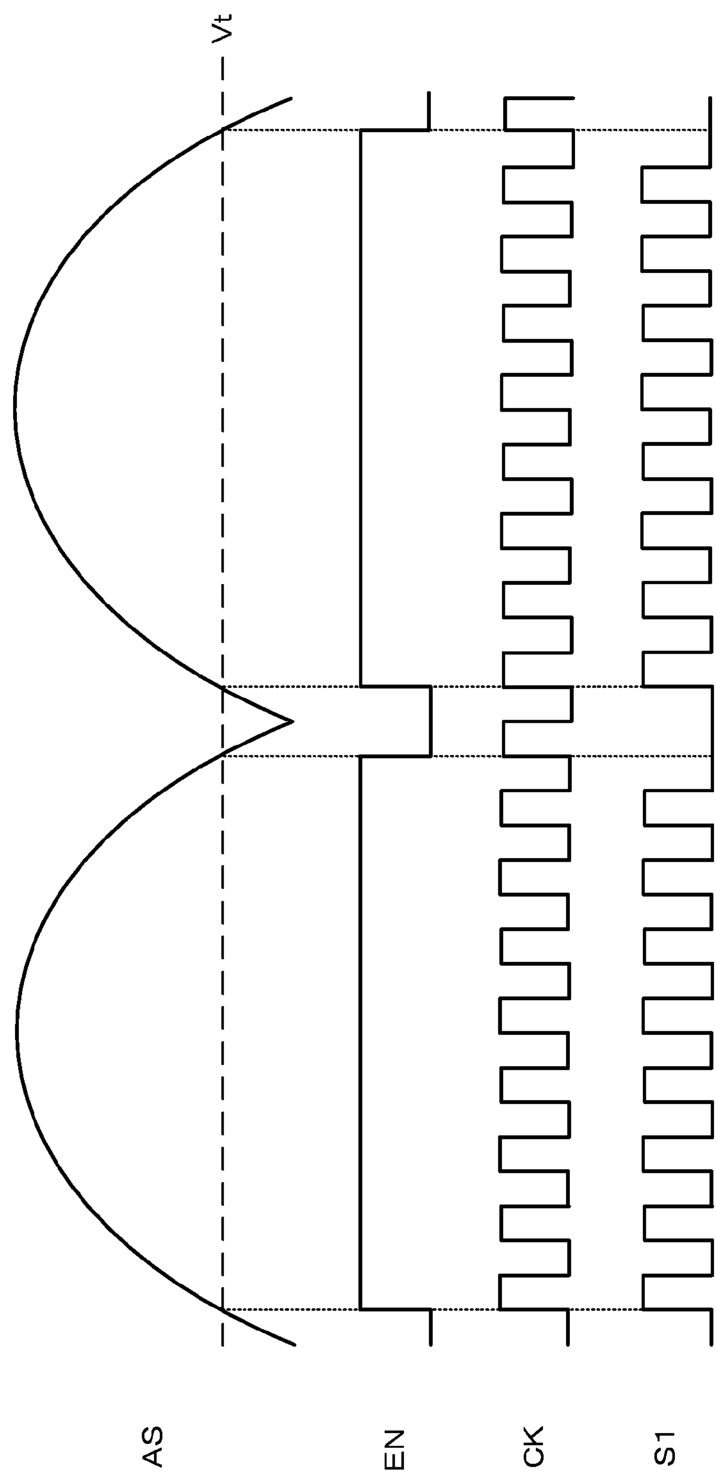
FIG. 3 is a waveform diagram showing operation of the synchronous control unit of the LED current control apparatus according to the first embodiment.

FIG. 3 shows an operation waveform of the synchronous control unit 12.

As shown in FIG. 3, the enable signal EN output from the voltage comparator 121 is at H-level during a time in which the rectified wave AS obtained by performing full-wave rectification on a voltage waveform of the commercial AC power ACIN exceeds the threshold value Vt.

The PLL circuit 122 outputs the clock signal CK with the frequency being N-times of the frequency of the enable signal EN as being synchronized with the enable signal EN.

During a time in which the enable signal EN is at H-level, the clock signal CK appears on the signal S1 output from the clock application control unit 123.

Figure 4:
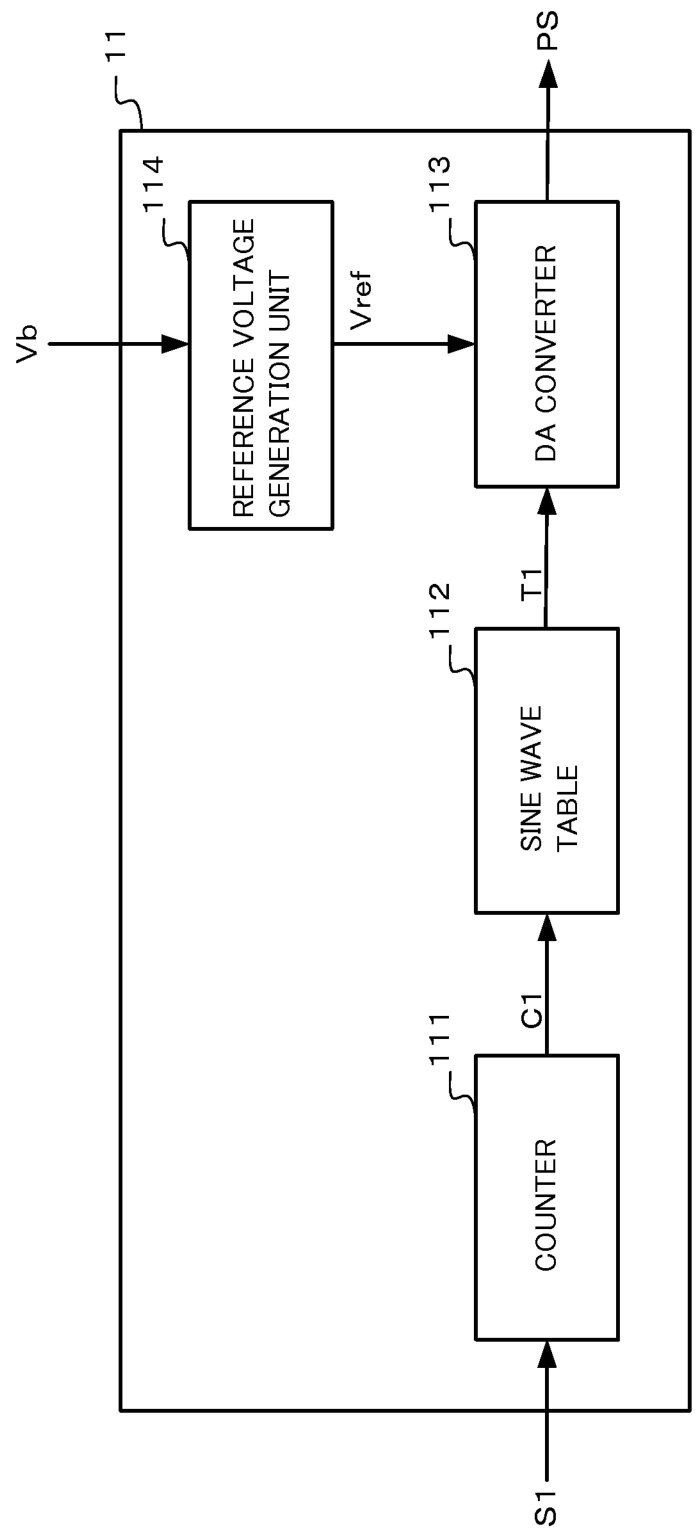
FIG. 4 is a block diagram showing a configuration of a pseudo sine wave generation unit of the LED current control apparatus according to the first embodiment.

FIG. 4 is a block diagram showing an internal configuration of the pseudo sine wave generation unit 11.

As illustrated in FIG. 4, the pseudo sine wave generation unit 11 includes a counter 111, a sine wave table 112, a digital-to-analog (DA) convertor 113, and a reference voltage generation unit 114. The counter 111 counts the signal S1 output from the synchronous control unit 12. The sine wave table 112 stores a sine wave value relative to a count value C1 of the counter 111. The DA convertor 113 performs DA conversion on a sine wave value T1 read from the sine wave table 112. The reference voltage generation unit 114 generates a reference voltage Vref to be applied to the DA convertor 113.

The counter 111 counts the signal S1 output from the synchronous control unit 12. Accordingly, the frequency of the signal S1 increases and count intervals of the counter 111 decrease with increase of the frequency dividing rate N of the 1/N divider 122*d* of the PLL circuit 122.

Increments of the sine wave values stored in the sine wave table 112 vary in accordance with the count intervals of the counter 111. As a result, accuracy of the pseudo sine wave PS output from the DA convertor 113 is improved with increase of the frequency dividing rate N of the 1/N divider 122*d* of the PLL circuit 122.

FIGS. 5(*a*) to 5(*d*) are diagrams showing the pseudo sine wave in the LED current control apparatus. The diagrams show variation of the sine wave table 112 and variation of the pseudo sine wave PS with respect to variation of the frequency dividing rate N of the 1/N divider 122*d* of the PLL circuit 122.

FIG. 5(*a*) shows an example of the sine wave table 112 and FIG. 5(*b*) shows a waveform of the pseudo sine wave PS when the frequency dividing rate N of the 1/N divider 122*d* is small.

On the other hand, FIG. 5(*c*) shows an example of the sine wave table 112 and FIG. 5(*d*) shows a waveform of the pseudo sine wave PS when the frequency dividing rate N of the 1/N divider 122*d* is large.

As can be seen from comparison between FIGS. 5(*b*) and 5(*d*), the waveform of the pseudo sine wave PS is smoothened with increase of the frequency dividing rate N of the 1/N divider 122*d*.

A crest value of the pseudo sine wave PS is determined by the reference voltage Vref applied from the reference voltage generation unit 114. Magnitude of the reference voltage Vref is constant regardless of the voltage of the commercial AC power ACIN.

Accordingly, even when the voltage of the commercial AC power ACIN has any value in a range of 100 to 240 V being a standard voltage in the world, for example, the pseudo sine wave PS having a continuously constant crest value can be obtained from the pseudo sine wave generation unit 11.

The comparator 13 performs comparison between the voltage value of the pseudo sine wave PS and the output voltage value Vm of the sensing resistor R1 which is connected to the switching transistor MT1.

The switch control unit 14 controls conduction of the switching transistor MT1 in accordance with a comparison result S2 of the comparator 13. The control due to the switch control unit 14 is performed as PWM control, for example. Here, the switch control unit 14 controls a conduction time of the switching transistor MT1 by varying an ON-width of a control signal S3 in accordance with the comparison result S2 of the comparator 13 and a result of the pulse monitor control unit 16.

Owing to the control of the switch control unit 14, the output voltage value Vm of the sensing resistor R1 varies to be matched with the voltage value of the pseudo sine wave PS. Since the crest value of the pseudo sine wave PS is constant regardless of voltage magnitude of the commercial AC power ACIN, the output voltage value Vm of the sensing resistor R1 falls in a constant range regardless of the voltage magnitude of the commercial AC power ACIN.

Accordingly, magnitude of the current flowing through the switching transistor MT1 is stabilized regardless of the voltage magnitude of the commercial AC power ACIN. As a result, a mean LED current flowing through the LED 1004 which is connected to the secondary side of the flyback convertor 1003 is stabilized.

Here, when a peak value of the commercial AC power ACIN is large, there is a case that the output voltage value Vm of the sensing resistor R1 is larger than the value of the pseudo sine wave PS owing to that variation of a current flowing through an inductor of the flyback convertor 1003 with respect to time (di/dt) is sharpened to cause switching response delay of the switching transistor MT1.

In such a case, in the embodiment, the crest value correction unit 15 corrects the crest value of the pseudo sine wave PS to lessen deviation between the output voltage value Vm of the sensing resistor R1 and the pseudo sine wave PS.

Figure 6:
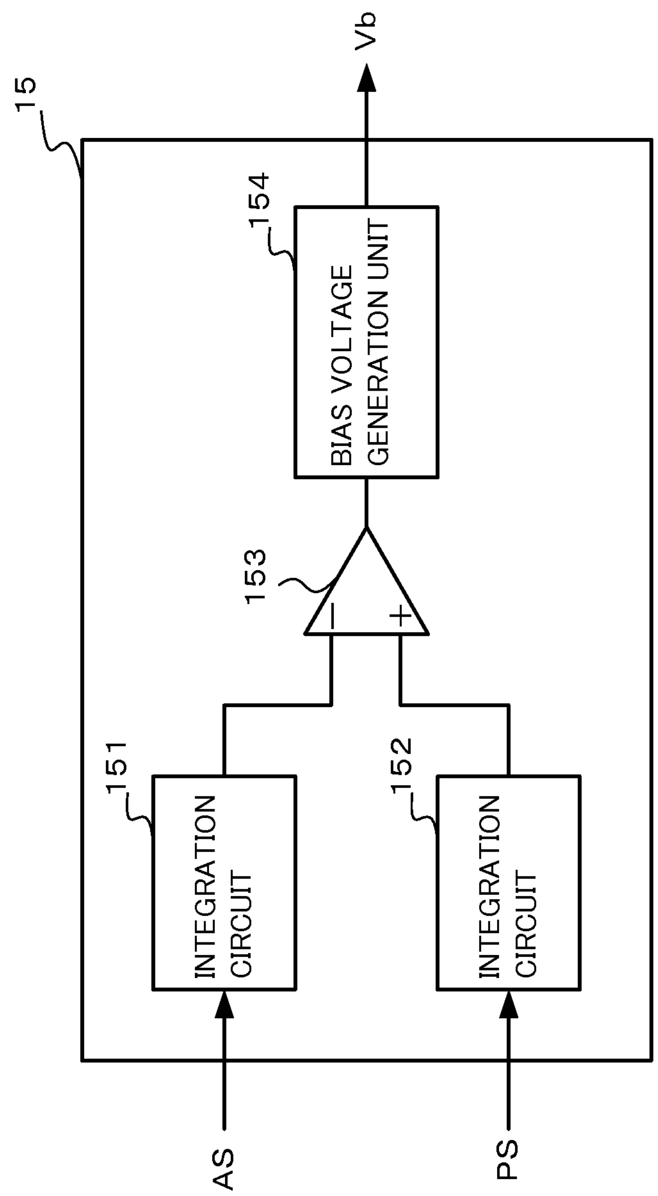
FIG. 6 is a block diagram showing a configuration of a crest value correction unit of the LED current control apparatus according to the first embodiment.

FIG. 6 is a block diagram showing an internal configuration of the crest value correction unit 15.

As shown in FIG. 6, the crest value correction unit 15 includes an integration circuit 151 (first integration circuit), an integration circuit 152 (second integration circuit), a comparator 153, and a bias voltage generation unit 154. The integration circuit 151 integrates the rectified wave AS. The integration circuit 152 integrates the pseudo sine wave PS. The comparator 153 compares an integration value of the integration circuit 151 and an integration value of the integration circuit 152. The bias voltage generation unit 154 generates a bias voltage Vb in accordance with a comparison result of the comparator 153. The bias voltage Vb is superimposed on the reference voltage Vref which is generated at the reference voltage generation unit 114 of the pseudo sine wave generation unit 11.

When the peak value of the commercial AC power ACIN is large, the integration value of the integration circuit 151 becomes larger than the integration value of the integration circuit 152. In such a case, the bias voltage generation unit 154 generates the bias voltage Vb to lower the reference voltage Vref.

When the reference voltage Vref is lowered, the crest value of the pseudo sine wave PS decreases as well and the output voltage value Vm of the sensing resistor R1 decreases following to the above. As a result, deviation between the output voltage value Vm of the sensing resistor R1 and the pseudo sine wave PS is lessened.

Figures 7A, 7B:
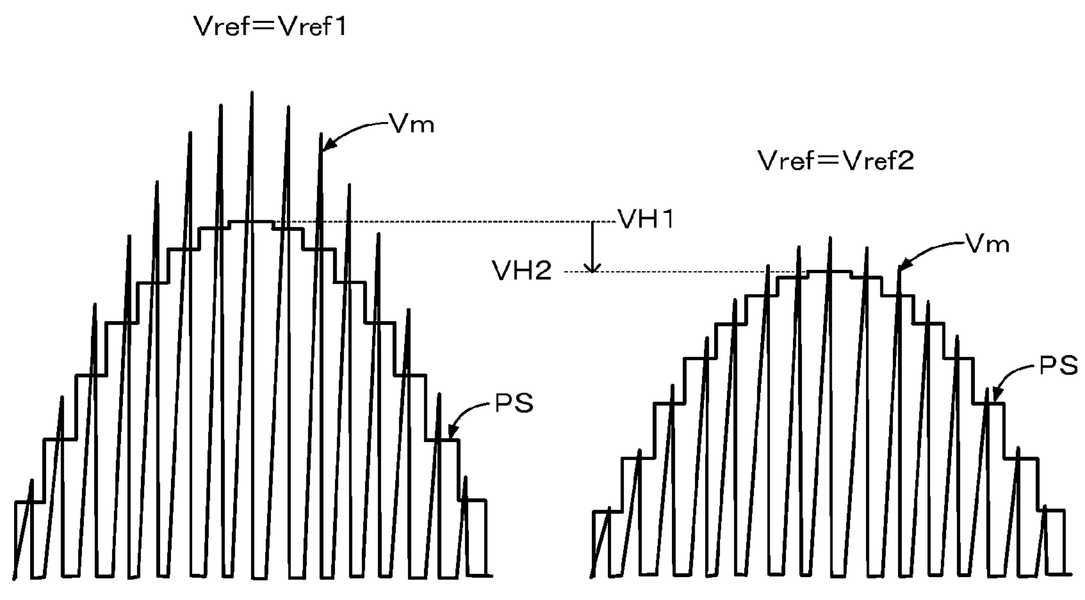
FIGS. 7(*a*) and 7(*b*) are waveform diagrams showing operation of the crest value correction unit of the LED current control apparatus according to the first embodiment.

FIGS. 7(*a*) and 7(*b*) show crest value correction operation of the pseudo sine wave PS by the crest value correction unit 15.

FIG. 7(*a*) shows the pseudo sine wave PS and a waveform of the output voltage value Vm of the sensing resistor R1 when the reference voltage Vref is Vref1 (i.e., Vref=Vref1). Here, there is large deviation between the output voltage value Vm of the sensing resistor R1 and the pseudo sine wave PS.

Therefore, the bias voltage generation unit 154 generates the bias voltage Vb to lower the reference voltage Vref. As a result, the reference voltage Vref becomes to Vref2 which is smaller than Vref1.

FIG. 7(*b*) shows the pseudo sine wave PS and a waveform of the output voltage value Vm of the sensing resistor R1 when the reference voltage Vref varies to Vref2.

Owing to that the reference voltage Vref varies from Vref 1 to Vref2, the crest value of the pseudo sine wave PS decreases from VH1 to VH2 as well. In accordance with the above, the output voltage value Vm of the sensing resistor R1 decreases and deviation against the pseudo sine wave PS is lessened.

As described above, the LED current control apparatus of the embodiment performs comparison between the output voltage value Vm and the pseudo sine wave PS and controls conduction of the switching transistor MT1. The output voltage value Vm is an output voltage value of the sensing resistor R1 connected to the switching transistor MT1 which is connected to the primary winding of the flyback convertor 1003. The crest value of the pseudo sine wave PS is constant. Accordingly, the current flowing through the switching transistor MT1 can be stabilized regardless of magnitude of the commercial AC power ACIN. It is possible to stabilize the mean LED current of the LED 1004 which is connected to the secondary side of the flyback convertor 1003.

Since a peak value of the pseudo sine wave PS can be corrected in accordance with magnitude of peak variation of the commercial AC power ACIN, deviation between the output voltage value Vm of the sensing resistor R1 and the pseudo sine wave PS can be lessened even when a current flowing through the inductor of the flyback convertor 1003 with respect to time (di/dt) is sharpened.

An LED current control apparatus according to a second embodiment will be described with reference to the drawings. In general, in many cases, an LED has smaller consumption power than a conventional filament lamp and a phase of an AC input current waveform is not delayed owing to that an LED is not an induction load. Accordingly, it is difficult for LED illumination to obtain a high power factor. In the embodiment, the LED current control apparatus has a configuration capable of delaying a phase of an AC input current waveform.

Figure 8:
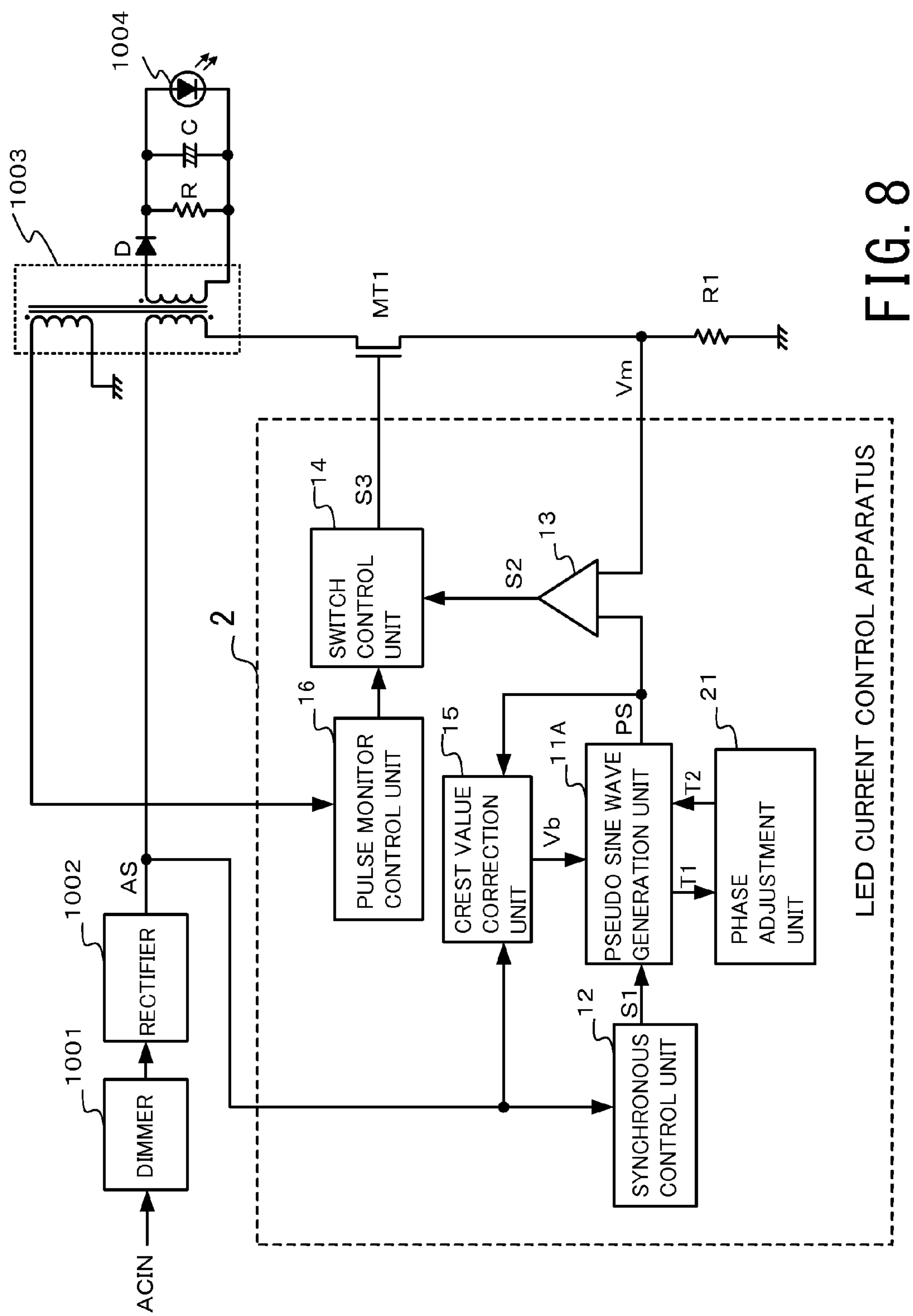
FIG. 8 is a block diagram showing a configuration of an LED current control apparatus of a second embodiment.

FIG. 8 is a block diagram showing an example of the configuration of the LED current control apparatus.

As shown in FIG. 8, in the LED current control apparatus 2, a phase adjustment unit 21 is added to the LED current control apparatus 1 of the first embodiment and the pseudo sine wave generation unit 11 is replaced with a pseudo sine wave generation unit 11A.

The phase adjustment unit 21 adjusts a phase of a pseudo sine wave PS generated at the pseudo sine wave generation unit 11A.

Figure 9:
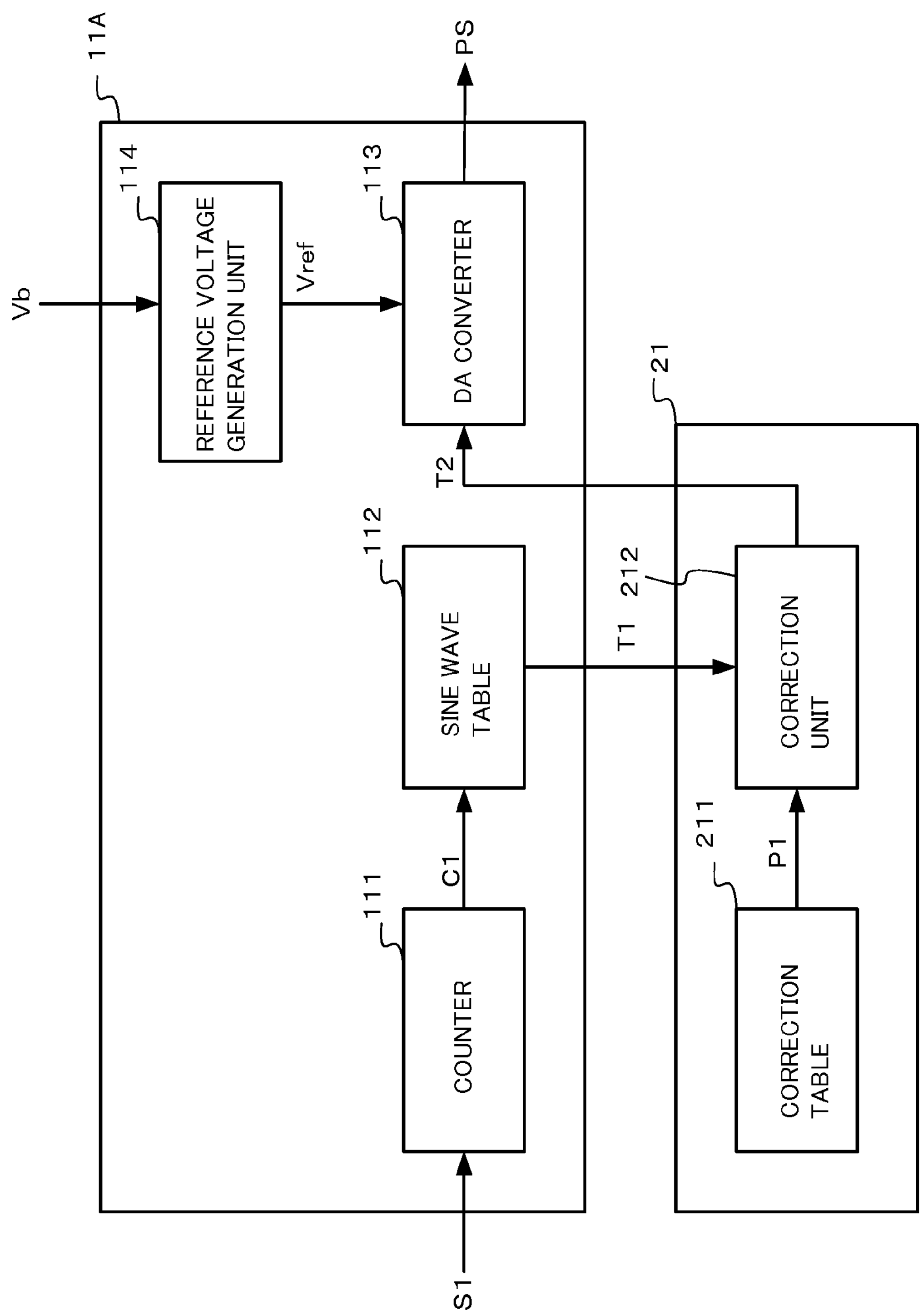
FIG. 9 is a block diagram showing a configuration of a pseudo sine wave generation unit and a phase adjustment unit of the LED current control apparatus according to the second embodiment.

FIG. 9 is a block diagram showing an internal configuration of the phase adjustment unit 21 and the pseudo sine wave generation unit 11A.

As shown in FIG. 9, the phase adjustment unit 21 includes a correction table 211 and a correction unit 212. The correction table 211 stores correction values P1 relative to values T1 of a sine wave table 112 of the pseudo sine wave generation unit 11A. The correction unit 212 corrects the value T1 of the sine wave table 112 using the correction value P1 read from the correction table 211. Output T2 of the correction unit 212 is output to a DA convertor 113 of the pseudo sine wave generation unit 11A.

The pseudo sine wave generation unit 11A has the same configuration as the pseudo sine wave generation unit 11 of the first embodiment except for that the value T1 of the sine wave table 112 is output to the correction unit 212 of the phase adjustment unit 21 and that the output T2 of the correction unit 212 is input to the DA convertor 113.

Figures 10A, 10B, 10C, 10D:
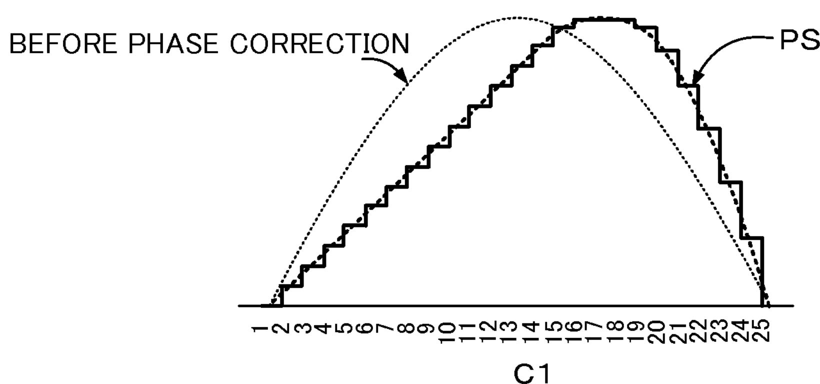
FIGS. 10(*a*) to 10(*d*) are diagrams showing a pseudo sine wave in the LED current control apparatus according to the second embodiment.

FIGS. 10(*a*) to 10(*d*) are diagrams showing operation of the phase adjustment unit 21 for phase adjustment of the pseudo sine wave PS.

FIG. 10(*a*) shows an example of the sine wave table 112. FIG. 10(*b*) shows an example of the correction table 211. FIG. 10(*c*) shows the output T2 of the correction unit 212.

FIG. 10(*d*) shows a waveform of the pseudo sine wave PS output from the DA convertor 113 with the output T2 of the correction unit 212.

As a result of the correction using the correction values P1 stored in the correction table 211, the pseudo sine wave PS has a waveform with a delayed phase compared to that before correction.

Following to the phase delay, a phase of the output voltage of the sensing resistor R1 is delayed. A phase of the current of the switching transistor MT1 flowing through the sensing resistor R1 is delayed. As a result, a phase of the AC input current waveform can be delayed.

As described above, in the LED current control apparatus of the embodiment, the phase of the AC input current waveform can be delayed by delaying the phase of the pseudo sine wave PS. Accordingly, a power factor of LED operation can be improved.

According to the LED current control apparatus of at least one of the embodiments described above, a mean LED current can be stabilized even when magnitude of a peak value of the AC input voltage varies. Further, it is possible to obtain a high power factor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A light emitting diode (LED) current control apparatus to control conduction of a switching transistor connected to a primary winding of a flyback convertor, a primary side of which receives a rectified wave obtained by rectifying AC input and a secondary side of which is connected to an LED, the LED current control apparatus comprising:

a pseudo sine wave generation unit to generate a pseudo sine wave having a constant crest value;

a synchronous control unit to synchronize a cycle of the pseudo sine wave with a cycle of the rectified wave;

a first comparator to compare a voltage value obtained by converting a current flowing through the switching transistor into a voltage with a voltage value of the pseudo sine wave;

a switch control unit to control conduction of the switching transistor in accordance with a comparison result of the first comparator;

a crest value correction unit to correct a crest value of the pseudo sine wave in accordance with variation of crest values of the rectified wave; and a pulse monitor control unit to monitor a width of a pulse supplied to the secondary winding using a tertiary winding of the flyback convertor and to adjust a switch frequency of the switch control unit.

2. The apparatus according to claim 1, wherein the pseudo sine wave generation unit includes a counter, a sine wave table, a DA convertor, and a reference voltage generation unit, the sine wave table stores a sine wave value relative to a value of the counter, the DA convertor performs DA conversion on the sine wave value read from the sine wave table, and the reference voltage generation unit generates a reference voltage to be applied to the DA convertor.

3. The apparatus according to claim 1, wherein the synchronous control unit includes a PLL circuit and a clock application control unit, the PLL circuit outputs a clock signal obtained by n-times multiplying a frequency of the rectified wave, and the clock application control unit applies the clock signal to the counter of the pseudo sine wave generation unit during a time in which a voltage of the rectified wave exceeds a previously-set threshold value.

4. The apparatus according to claim 3, wherein the synchronous control unit further includes a voltage comparator to compare a voltage of the rectified wave with the previously-set threshold value, to generate an enable signal being at high level during a time in which the voltage of the rectified wave exceeds the threshold value, and to output the enable signal to the PLL circuit and the clock application control unit.

5. The apparatus according to claim 4, wherein a signal output from the synchronous control unit to the pseudo sine wave generation unit is set at low level when the voltage of the rectified wave is smaller than the threshold value.

6. The apparatus according to claim 4, wherein the PLL circuit includes a phase comparator, a loop filter, a voltage controlled oscillator (VCO), and a 1/N divider, the phase comparator detects a phase difference between the enable signal and output of the 1/N divider, the loop filter generates a control signal obtained by performing low-band filtering on a phase difference signal output from the phase comparator, the VCO is controlled by the control signal, and the 1/N divider outputs a signal having a frequency being N-times of a frequency of the enable signal to the phase comparator as being synchronized with the enable signal based on a signal output from the VCO.

7. The apparatus according to claim 1, wherein the crest value correction unit includes a first integration circuit, a second integration circuit, a second comparator, and a bias voltage generation unit, the first integration circuit integrates the rectified wave, the second integration circuit integrates the pseudo sine wave, the second comparator compares an integration value of the first integration circuit with an integration value of the second integration circuit, and the bias voltage generation unit generates a bias voltage in accordance with a comparison result of the second comparator to be superimposed on the reference voltage of the pseudo sine wave generation unit.

8. The apparatus according to claim 1, further comprising a phase adjustment unit to adjust a phase of the pseudo sine wave.

9. The apparatus according to claim 8, wherein the pseudo sine wave generation unit includes a counter, a sine wave table, a DA convertor, and a reference voltage generation unit, the sine wave table stores a sine wave value relative to a value of the counter, the DA convertor performs DA conversion on a value of the pseudo sine wave with a phase adjusted by the phase adjustment unit, and the reference voltage generation unit generates a reference voltage to be applied to the DA convertor.

10. The apparatus according to claim 9, wherein the phase adjustment unit includes a correction table and a correction unit;

the correction table stores a correction value relative to a sine wave value of the sine wave table, and the correction unit corrects the sine wave value of the sine wave table with the correction value of the correction table and output the corrected sine wave value to the DA convertor.

* * * * *